S. D. DOUTHIT.
Cultivators.

No. 147,616. Patented Feb. 17, 1874.

WITNESSES
Mary S. Utley.
Robert Everett.

INVENTOR
Samuel D. Douthit
By Chipman & Fosmere Co.
ATTORNEYS.

UNITED STATES PATENT OFFICE.

SAMUEL DAVIS DOUTHIT, OF BOYDSVILLE, KENTUCKY.

IMPROVEMENT IN CULTIVATORS.

Specification forming part of Letters Patent No. 147,616, dated February 17, 1874; application filed December 6, 1873.

*To all whom it may concern:*

Be it known that I, SAMUEL D. DOUTHIT, of Boydsville, in the county of Graves and State of Kentucky, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1:
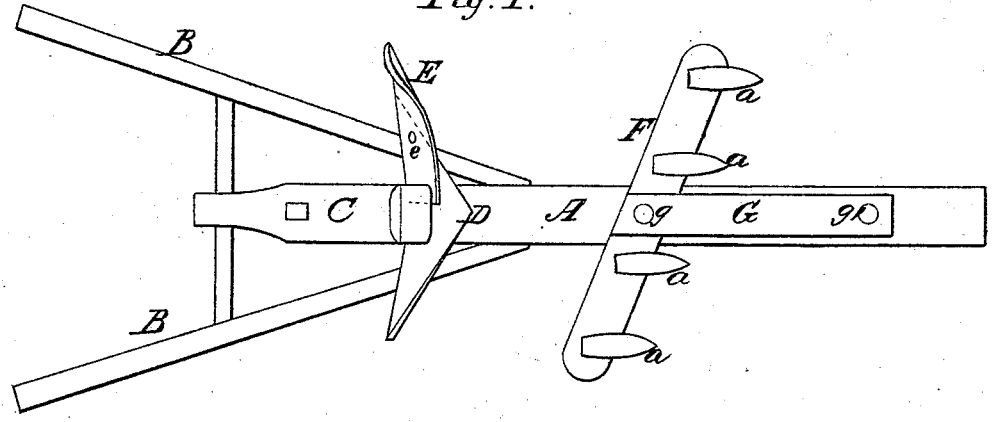
Figure 2:
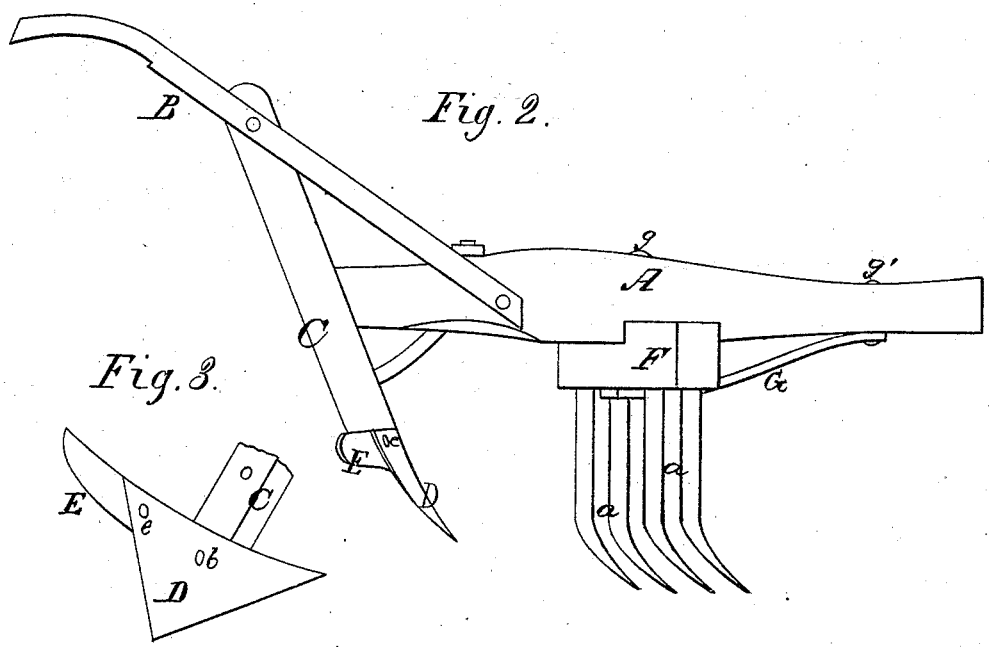
Figure 3:
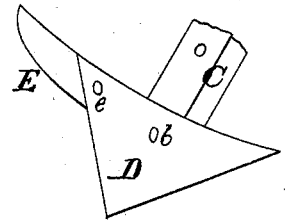

Figure 1 of the drawings is a representation of a plan view of my cultivator. Fig. 2 is a side view of the same. Fig. 3 is a detail view.

This invention has relation to cultivators which are especially intended for young plants; and it consists in an obliquely-arranged harrow, in combination with a shovel-plow having a laterally-extended wing on one side of it, whereby the clods of earth and trash are raked away from the plants at the same time that the shovel and its wing throw the earth about the roots of the plants, as will be hereinafter explained.

In the annexed drawings, A represents a plow-beam; C, an inclined standard secured to the rear end of this beam, and B B the handles of the implement. D represents a diamond-shaped shovel, which is secured by a bolt, *b*, to the standard C. To one of the wings (the right-hand wing) of the shovel D a wing or fin, E, is secured by means of the bolt *b* and another bolt, *e*. This wing or fin E is a narrow, curved blade, which forms a lateral extension of the upper portion of the shovel, and which is directed backward at such an angle as will cause it to throw the loose surface-soil about the roots of the plants, while the lower pointed portion of the shovel loosens up the earth. In front of this shovel D is a harrow or rake, which consists of a horizontal bar, F, armed with a row of teeth, *a*. The bar F is arranged obliquely to the line of draft, and it is so arranged that it directs the sods, &c., into the middle of the furrow between the rows, out of the way of the shovel. This bar F is rigidly secured to the beam A by means of a vertical bolt, *g*, the lower end of which is sustained against backward strain on the teeth *a* by means of a brace, G, which is secured by a bolt, *g'*, to the beam A.

It will be seen from the above description that the wing or fin E on the shovel inclines in an opposite direction to the angle or obliquity of the harrow or rake teeth, so that while these teeth rake the sods, clods, and trash away from the plants, the said wing E throws the loose surface-soil about the roots of the plants.

What I claim as new, and desire to secure by Letters Patent, is—

In combination with the teeth *a*, beam A, and shovel D, the wing E, attached to the shovel D at an angle the reverse of that formed by the teeth *a*, substantially as described.

In testimony that I claim the above, I have hereunto subscribed my name in the presence of two witnesses.

SAMUEL DAVIS DOUTHIT.

Witnesses:
 S. L. NANCE,
 H. C. COOK.